Patented Aug. 25, 1931

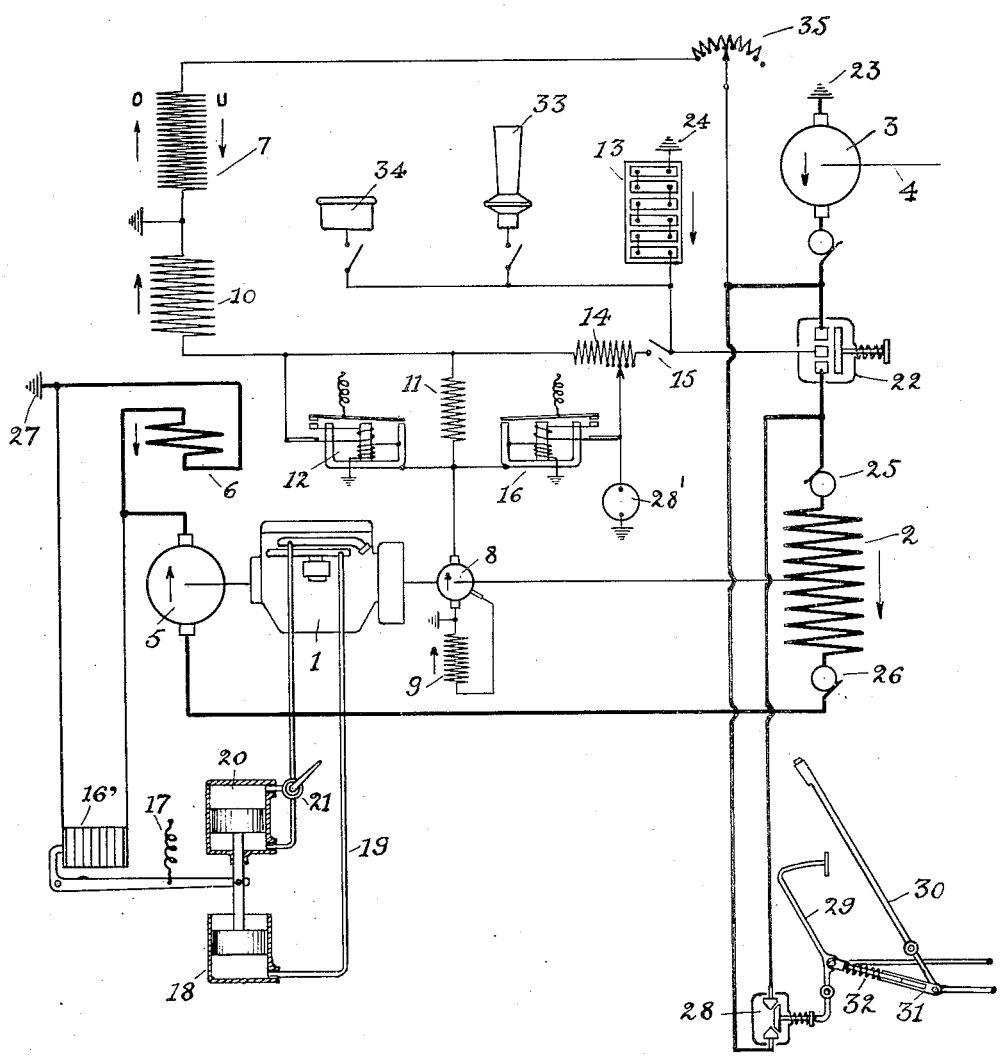

1,820,863

UNITED STATES PATENT OFFICE

ALFONS HENRY NEULAND, OF IRVINGTON, NEW JERSEY, ASSIGNOR TO ELECTRO-MOBILE CORPORATION, OF IRVINGTON, NEW JERSEY

ELECTRIC SYSTEM FOR VEHICLES

Application filed July 12, 1928. Serial No. 292,194.

This invention relates in general to improved methods and means for electromagnetically transmitting power from a prime mover to a load and for controlling the same. In my copending application Serial No. 219,227 filed September 13, 1927, for automatic power transmission I disclosed an apparatus including clutch and booster dynamos for transmitting power and for automatically controlling the torque and speed changes between a prime mover and a load.

My invention is particularly adapted for use in the type of apparatus in which two dynamos cooperate with each other for transmitting power between a power shaft and a load shaft and in which one of the dynamos is rotatably associated with both shafts by a suitable direct or indirect mechanical connection.

Other objects are to provide efficient excitation, improved means and circuit connections for stabilizing operation and maintaining clutch polarity during engine idling and transition periods and during sudden throttle changes.

Still another object is to regulate engine speed by the cooperation between the engine vacuum and exhaust pressure and the electric circuits.

Generally the object of my invention is to provide a complete electric system for motor vehicles including transmission of power, starting, battery charging, to automatically regulate the engine speed by electric means and by the engine vacuum and exhaust and to provide methods and means for safely controlling engine and vehicle.

The single figure of the drawing is a wiring diagram of the system showing schematically the relationship between the electrical and mechanical elements of the system and the engine, propeller, brakes and translating devices on the vehicle.

Referring to the drawing the vehicle engine 1 drives the series field coil 2 mounted on the field system of the clutch dynamo. The clutch armature 3 drives the propeller shaft of the vehicle represented by 4. The booster dynamo has an armature 5 operatively connected to the shaft of the engine 1 and is provided with a series field coil 6. The two armatures and field coils are connected in series and form the load circuit represented by the heavy line, the booster coil 6 being reversed so that when current flows therein the booster exerts a torque in the direction of engine rotation. The booster is provided with a shunt coil 7, connected to the clutch and booster, to receive a relatively small current from the former when propeller shaft underspeeds engine and from the latter when propeller overspeeds. I also provide an auxiliary dynamo having an armature 8 driven by the engine shaft and having a field coil 9 connected to a third brush. The auxiliary dynamo is connected to the auxiliary booster coil 10 thru the resistance 11 or thru the automatic switch 12 when closed and partially supplies the booster excitation especially during the engine idling and transition periods. The auxiliary dynamo also supplies current to the battery 13 customarily carried on motor vehicles thru the resistance 14 and ignition switch 15 or thru the cut out switch 16 when closed.

I further provide means for shunting current away from the booster series coil 6 such as a compressible carbon pile regulator 16' normally held open by the spring 17 and adapted to be closed or compressed by the piston in the cylinder 18 supplied by vacuum from the engine manifold thru the pipe line 19 or to be operated by the piston in cylinder 20 with pressure from the engine exhaust thru the valve 21 for admitting to either end of cylinder.

My system provides for controlling power flow to propeller and the engine speed by variously depressing the engine throttle. This relieves the operator of much manipulation required with other control systems and insures greater safety in the operation of motor vehicles.

The operation of the system in a motor vehicle may best be understood from the following: When operator depresses the starting switch 22 current from the battery 13 flows to the switch 22 where it divides, a part flowing thru armature 3, grounds 23 and 24 back to battery. Another part flows thru ring 25 field coil 2 ring 26 armature 5 coil 6 to grounds 27 and 24 back to battery. Direction of current in clutch armature 3 is reversely to arrow and produces a powerful torque on the coil 2 in the direction of engine rotation aided by booster torque in the same direction. As the engine turns over booster counter potential weakens clutch field and causes engine to spin at a good speed so that closing of the switch 15 establishes connection with the ignition coil 28' and sets the engine in operation.

This feature is claimed in my copending application Serial #219,226 filed September 13, 1927.

The engine having started, the operator releases the starting switch interrupting the battery current in main circuit and at the same time opening the load circuit. I provide a control switch 28 operated by the movement of the service brake pedal 29 or by the emergency brake lever 30 thru the rod and spring 31 and 32 adjusted so that when the emergency brake is set, the switch 28 is opened and the load circuit interrupted permitting operator to leave the wheel to make adjustments while engine is in operation. When at the wheel a slight depression of pedal 29 keeps the switch 28 open and the clutch from exerting a torque on propeller. When ready to start the vehicle, operator permits pedal to resume normal position, the switch 28 closes the load circuit and permits current to flow therein.

It is well known that a system in which a series generator drives a series motor is subject to surges and reversal of polarity. This difficulty exists to a marked degree where the generator and motor have separate field systems and when they are both connected to an engine as in the present instance. My system provides efficient means for overcoming this difficulty. As stated, the ignition switch 15 establishes a circuit from the battery thru resistance 14 and permits a small current to flow thru the auxiliary booster coil 10 just sufficient to reverse the booster field flux when current in load circuit decreases to a small value or when it ceases altogether. During the engine idling period the load current is small and any tendency of the booster counter potential to predominate, which would be accompanied by a load current decrease and reversal, is counteracted by the moderate magnetomotive force in coil 10 which, being opposed to that of coil 6, instantly decreases or even reverses the booster flux and electromotive force. This automatically counteracts any tendency to surge, prevents current reversal in load circuit and maintains an unvarying idling speed.

The auxiliary dynamo armature 8 also serves the purpose of stabilizing the system during the idling period and is connected to the coil 10 thru resistance 11. Its effectiveness is even greater in that the decreasing load current causes the engine idling speed as well as the potential in armature 8 and current in coil 10 to increase and to stabilize the system. It is obviously very desirable to maintain the equilibrium with only moderate magnetomotive forces in the booster field which requires only a small current, prevents loss of energy and heating during stops and while the vehicle coasts.

The maximum propeller torque is produced with wide open throttle when vehicle wheels are locked. This raises the engine speed to about 500 R. P. M., the exact speed depending on the relationship between clutch and booster armature conductors and flux with due regard to the losses in the units which must not exceed the power that the engine is able to develop at this relatively low speed. The clutch must be proportioned to transmit the maximum propeller torque and the booster to supply the difference between the propeller and engine torques. With wide open throttle the vacuum in engine intake manifold and in the cylinder 18 is very low which permits the spring 17 to open carbon pile 16', assuming for the present that the valve 21 is closed and the cylinder 20 inactive.

The more powerful clutch sends a very strong current thru the booster, most or all of which traverses coil 6 and causes booster to exert a powerful torque in direction of engine rotation. From the foregoing it is seen that the coil 6 is active to the greatest extent when the booster and clutch must produce their maximum torque and is practically inactive when throttle is closed or only partially open. This arrangement permits the use of a much stronger booster and greater engine torque multiplication for the reason that the strong booster action which ordinarily would cause surging is automatically diminished as the throttle opening is decreased and vacuum in cylinder 18 increases. This shunts current away from coil 6 and in cooperation with the slight current in coil 10 prevents surging. During the underspeeding period the shunt coil 7 also received a current from armature 3 in direction of arrow U and cooperates with coil 6 in producing motor action, the opposition due to coil 10 being practically negligible inasmuch as the engine speed and potential of armature 8 is still inconsiderable, the current thru coil 10 being still further limited by the resistance 11.

As soon as the wheels are unlocked and the vehicle is permitted to accelerate with the throttle wide open the engine speed instantly increases, potential of armature 8 builds up and closes the automatic switch 12. This establishes a direct connection with coil 10, the increased current therein diminishes booster motoring flux and keeps the engine from speeding up at too great a rate. At the same time vacuum in cylinder 18 increases, current from coil 6 is shunted away and booster action still further decreases. During this period armature 3 has sped up and speed difference as well as potential in armature 3 and current in coil 7 have diminished, still further decreasing booster motoring torque and causing the propeller to accelerate at a greater rate than engine. This process continues until the propeller speed nearly equals that of engine, when voltage in armature 3 has decreased and is just sufficient to force the load current thru circuit. Current flow in coil 7 has practically ceased, and the magnetomotive force in coil 10 now equals that of coils 6 and 7 resulting in zero booster field flux and electromotive force. As the engine and propeller speeds increase beyond this point current in coil 10 further increases, its magnetomotive force predominates over coil 6, and reverses the booster field flux. The booster now generates an ever increasing potential and gradually takes over the duty of energizing the clutch until, when the clutch elements are in synchronism, it generates the required potential to maintain the load current in the circuit. Current in coil 7 has reversed, being now supplied from booster armature 5 in the direction of arrow O, and since this continually increasing current is now cooperating with the current in coil 10 and is in opposition to the steadily diminishing current in coil 6, the booster flux and electromotive force build up rapidly and cause the propeller shaft to overspeed the engine and to accelerate at a greater rate.

After the operator has accelerated the vehicle to the desired speed and wishes to maintain this speed, a partial release of the accelerator is accompanied by an increased vacuum in cylinder 18, resulting in lessened opposition from coil 6, increased booster flux and potential, and a greater booster load on engine. As the engine throttle and torque ability have been reduced the greater load thereon results in a lowered engine speed, a relatively greater part of the engine torque going to the booster, and the clutch receiving just enough to satisfy the road torque. A change of throttle at a time when the speed difference between the clutch elements is small will cause the booster to change from a generator to a motor or vice versa and the propeller shaft to pass thru synchronism.

From the foregoing it will be understood that stabilization during the idling period, changing relationships and transition during the acceleration cycle as well as engine speed regulation have all been accomplished automatically, variations of the accelerator sufficing to control the power flow and transformation under all conditions. This relieves the operator from the strain and exercise of skill incidental to other control systems and permits him to pay closer attention to the road and to the safe operation of the vehicle. The switch 28 serves as an added safeguard and enables the operator instantly to interrupt the power flow by slightly depressing pedal 29 in case his accelerator gets jammed or for other reasons.

It is seen that when underspeeding with full throttle the coils 6 and 7 cooperate in producing a powerful motoring action and are practically unopposed by coil 10 and that during the overspeeding period with throttle partly open coils 7 and 10 cooperate to produce a powerful generator action practically unopposed by the coil 6 resulting in low and economical engine speed and in efficient booster operation and the system during the entire operating cycle. A ratio changer 35 may be included in circuit with coil 7 to adjust the current therein, useful in readjusting the torque relationships when engine is cold or has lost compression. This coil may be open circuited or in some instances omitted and a modified control accomplished by the remaining elements of the system. The shunt coil feature of the system is described and claimed in my copending application Serial #219,226 filed Sept. 13, 1927.

As above mentioned the valve 21 admits pressure from the exhaust manifold to lower or upper part of cylinder 20 serving still further to control current in coil 6 and to mold the engine speed characteristic as desired.

My system is electrically connected and cooperates with the devices on the vehicle and supplies current to the battery 13, ignition coil 28', horn 33 and lamp 34 thru the cut out 16 which closes when the voltage of the armature 8 equals that of battery. If desired the resistance 14 may be adjusted so that the potential impressed on the coil 10 differs from that impressed on the battery. In this connection it will be seen that the switches 12 and 16 may be adjusted to close at different times rendering the regulation of coil 10 independent from the operation of the other devices on the vehicle.

I wish to point out that the subject matter for energizing and controlling the dynamos is broadly claimed in my application Serial #219,227 filed Sept. 13, 1927, and that the feature of simultaneously energizing an ignition coil for the engine and the system is claimed in my application Serial #294,993 filed July 24, 1928.

While I have herein shown a complete electric system embodying my invention and described its operation in connection with a motor vehicle, I desire to have it understood that my invention is adapted for other uses and that it may be used in whole or in part, depending upon the conditions to be met, in the described or other embodiments within the principle and scope of my invention.

Having described my invention what I claim and desire to secure by Letters Patent is:

1. In combination, an internal combustion engine, developing a varying vacuum and driving a load, two dynamo electric machines for transmitting power from engine to load having field poles, and means operative by the variations in the engine vacuum for reversing the magnetic flux in the field poles of one of the dynamos.

2. In combination an internal combustion engine developing a vacuum and driving a load, a clutch dynamo interposed between engine and load, a booster dynamo operatively connected to engine and having a plurality of field coils, and means operated by the engine vacuum for varying the current in one of the field coils.

3. In combination, an internal combustion engine developing an exhaust pressure and driving a load, two dynamo electric machines for transmitting power from engine to load having field poles, and means operative by the exhaust pressure for reversing the magnetic flux in the field poles of one of the dynamos.

4. In combination, an internal combustion engine developing an exhaust pressure and driving a load, a clutch dynamo interposed between engine and load, a booster dynamo operatively connected to engine and having a plurality of field coils and means operated by the engine exhaust pressure for varying the current in one of the field coils.

5. In combination, an engine shaft, a load shaft, a dynamo rotatively connected with one of the shafts, having a field coil, a second dynamo rotatively connected with both shafts, a load circuit including the dynamos, an auxiliary generator, a battery, and means for supplying the field coil with current from the auxiliary generator during relatively high speeds of engine shaft and from the battery during relatively low speeds of engine shaft.

6. In combination, a vehicle having auxiliary devices, an engine having a shaft, a load shaft, a dynamo rotatively connected with both shafts, a second dynamo rotatively connected with one of the shafts having a field coil, a battery adapted to supply current to the auxiliary devices on the vehicle, an auxiliary generator operative to supply a relatively small current to said field coil during relatively low engine speeds, and means for increasing current in field coil and for charging the battery from the auxiliary generator during relatively higher engine speeds.

7. In combination, an engine shaft, a load shaft, a dynamo rotatively connected with both shafts, a second dynamo rotatively connected with one of the shafts and having a plurality of field coils, conductors for connecting one of the field coils to receive shunt current from one of the dynamos, and a separate source of potential for supplying current to another field coil.

8. In combination, a vehicle, an engine having a shaft, a load shaft, a dynamo rotatively connected with both shafts, a second dynamo rotatively connected with one of the shafts having a plurality of field coils, conductors for connecting one of the field coils to receive shunt current from first dynamo in one direction and current from second dynamo in the opposite direction, a separate source of potential for supplying current to a second field coil, and a switch adapted to connect the separate source to the second field coil.

9. In combination, an engine shaft, a load shaft, a dynamo rotatively connected with both shafts, a second dynamo rotatively connected with one of the shafts having a field coil, an auxiliary generator, a battery, a plurality of resistances, an exciting circuit including the field coil, auxiliary generator and one of the resistances, a second exciting circuit including the field coil, battery and another of said resistances, a switch adapted to short-circuit the resistance in the first exciting circuit, and a second switch adapted to short-circuit the resistance in the second exciting circuit.

10. In combination, a vehicle, an engine having a shaft, a load shaft, a dynamo rotatively connected with both shafts, a second dynamo rotatively connected with one of the shafts having a field coil, a resistance, a battery, an exciting circuit including the field coil, resistance and battery, an auxiliary generator, and an electro-magnetic switch adapted to connect the auxiliary generator to the field coil.

11. In combination, a vehicle, an engine having a shaft, a load shaft, a dynamo rotatively connected with both shafts, a second dynamo rotatively connected with one of the shafts having a field element, a battery carried by the vehicle, and means for magnetizing the field element with a minor current from the battery during relatively low engine speeds and means for increasing the magnetization of the field element as the engine speed increases.

12. In combination, a vehicle, an engine having a shaft, a load shaft, a dynamo rotatively connected with both shafts, a second dynamo rotatively connected with the engine shaft having field poles, an auxiliary generator carried by the vehicle operative to magnetize the field poles with a relatively small current during low engine speeds and means for automatically increasing the magnetizing current from the auxiliary generator as the engine speed increases.

13. In combination, a vehicle, an engine having a shaft, a load shaft, a dynamo rotatively connected with both shafts, a second dynamo rotatively connected with engine shaft, a load circuit including the dynamos, a battery, a switch adapted in one position to establish a circuit including the battery and first dynamo and a second circuit including the battery and second dynamo, and adapted when in another position to open the load circuit, and a second switch adapted to close the load circuit.

14. In combination, a vehicle having a brake lever, an engine having a shaft, a load shaft, a dynamo rotatively connected with both shafts, a second dynamo rotatively connected with one of the shafts, a load circuit including the dynamos, a battery, a switch operative in one position to connect battery to load circuit for starting the engine and in another position to open the load circuit, and a second switch adapted to close the load circuit by the movement of the brake lever in one direction and to open the load circuit by movement of the brake lever in the other direction.

15. In combination, a vehicle, an engine having a shaft, a load shaft, a dynamo rotatively connected with both shafts, a second dynamo rotatively connected with engine shaft, a load circuit including the dynamos, a control switch in the load circuit adapted when in an open position to open the load circuit and when in another position to close the load circuit, a battery, and means including the battery for starting the engine when control switch is in the open position.

16. In combination, an internal combustion engine having a shaft and developing a vacuum, a load shaft, two dynamo electric machines rotatively connected to engine shaft and adapted to transmit power between the shafts, a load circuit including the dynamos, and means operated by the engine vacuum for varying the current in the load circuit.

17. In combination, an internal combustion engine having a shaft and developing a pressure, a load shaft, two dynamo electric machines rotatively connected to engine shaft and adapted to transmit power between the shafts, a load circuit including the dynamos, and means operated by the engine pressure for varying the current in the load circuit.

Signed at Newark in the county of Essex and State of New Jersey this 10th day of July A. D. 1928.

ALFONS HENRY NEULAND.